(12) United States Patent
Tsuchida et al.

(10) Patent No.: US 11,669,702 B2
(45) Date of Patent: *Jun. 6, 2023

(54) COMMODITY CONTAINER, PORTABLE REGISTRATION DEVICE, AND COMMODITY REGISTRATION METHOD

(71) Applicant: TOSHIBA TEC KABUSHIKI KAISHA, Tokyo (JP)

(72) Inventors: Sunao Tsuchida, Mishima Shizuoka (JP); Jun Yaginuma, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/410,389

(22) Filed: Aug. 24, 2021

(65) Prior Publication Data

US 2021/0383083 A1    Dec. 9, 2021

Related U.S. Application Data

(63) Continuation of application No. 16/575,947, filed on Sep. 19, 2019, now Pat. No. 11,126,806.

(30) Foreign Application Priority Data

Oct. 19, 2018  (JP) .............................. JP2018-197619
Jan. 8, 2019   (JP) .............................. JP2019-001253

(51) Int. Cl.
G06K 7/10     (2006.01)
G06K 19/07    (2006.01)

(52) U.S. Cl.
CPC ..... *G06K 7/10366* (2013.01); *G06K 19/0723* (2013.01)

(58) Field of Classification Search
CPC ........................ G06K 7/10366; G06K 19/0723
(Continued)

(56) References Cited

U.S. PATENT DOCUMENTS 8,040,221 B2    10/2011  Murray et al.
2002/0174025 A1  11/2002  Hind et al.
(Continued)

FOREIGN PATENT DOCUMENTS

JP    H10-162247 A    6/1998
JP    2008-027192 A   2/2008
(Continued)

OTHER PUBLICATIONS

Notice of Reasons for Refusal dated Jan. 31, 2023 in corresponding Japanese Patent Application No. 2019-001253, with English translation, 6 pages.

*Primary Examiner* — Allyson N Trail
(74) *Attorney, Agent, or Firm* — Kim & Stewart LLP (57) ABSTRACT

A commodity container includes a main body with a container space and a radio frequency reader with a communication range that covers an opening of the container space. The radio frequency reader outputs tag information based on a radio frequency signal from a wireless tag and outputs time variation information indicating a time variation of the radio frequency signal. A registration device is attached to the main body and includes a communication interface to receive the tag and time variation information, and a processor configured to determine a time variation in a positional relationship of the wireless tag and the radio frequency reader based on the time variation information and update a commodity registration list based on the determined time variation of the positional relationship.

20 Claims, 5 Drawing Sheets

(58) Field of Classification Search
USPC .......................................................... 235/451
See application file for complete search history.

(56) References Cited

U.S. PATENT DOCUMENTS

| | | |
|---|---|---|
| 2009/0231135 A1 | 9/2009 | Chaves et al. |
| 2010/0264205 A1 | 10/2010 | Iida |
| 2011/0221576 A1 | 9/2011 | Itagaki |
| 2012/0293305 A1 | 11/2012 | Shaw et al. |
| 2017/0206721 A1 | 7/2017 | Koo |
| 2018/0370554 A1 | 12/2018 | Raza et al. |
| 2019/0042810 A1 | 2/2019 | Tsuchida et al. |
| 2020/0125809 A1 | 4/2020 | Tsuchida et al. |
| 2020/0143121 A1 | 5/2020 | Sakurai |

FOREIGN PATENT DOCUMENTS

| | | |
|---|---|---|
| JP | 2011-191822 A | 9/2011 |
| JP | 2015-214391 A | 12/2015 |
| JP | 2016-161995 A | 9/2016 |
| JP | 2020-057109 A | 4/2020 |

FIG.5

COMMODITY CONTAINER, PORTABLE REGISTRATION DEVICE, AND COMMODITY REGISTRATION METHOD

CROSS-REFERENCE TO RELATED APPLICATIONS

This application is a continuation of U.S. patent application Ser. No. 16/575,947, filed Sep. 19, 2019, which is based upon and claims the benefit of priority from Japanese Patent Application No. 2018-197619, filed Oct. 19, 2018, and Japanese Patent Application No. 2019-001253, filed Jan. 8, 2019, the entire contents of which are incorporated herein by reference.

FIELD

Embodiments described herein relate generally to a commodity container, a portable registration device, and a commodity registration method.

BACKGROUND

For a retail store in which items with a wireless tag, (such as a Radio Frequency Identifier (RFID) tag), are sold, an article data processing device (also referred to as a commodity data processing device) has been developed for generating a list of the items that have been placed in a shopping cart, basket, container, or the like. The commodity data processing device generates the list of commodities based on information from the RFID tags attached to the commodities. The commodity data processing device acquires the information of the RFID tags from a RFID reader (also referred to as a wireless tag reader) that has been mounted on the cart or the like. The RFID reader reads the RFID tags within some communication range, and transmits the information acquired from the RFID tags to the commodity data processing device.

The communication range of the RFID reader needs to cover a storage region (e.g., a basket portion) of the shopping cart. However, it is difficult to narrow the communication range down to only cover the storage region and nothing else without including shielding to prevent the radio waves from the reader from straying, and thus there is a problem that the RFID readers may read a RFID tag that is attached to a commodity that has not been placed in the cart.

DETAILED DESCRIPTION

According to an embodiment, a commodity container includes a main body with a container space and a radio frequency reader with a communication range that covers at least part of an opening of the container space. The radio frequency reader is configured to output tag information based on a radio frequency signal received from a wireless tag attached to a commodity and also output time variation information indicating a time variation of the radio frequency signal. A registration device is attached to the main body and includes a communication interface configured to receive the tag information and the time variation information from the radio frequency reader and a processor. The processor is configured to: determine a time variation of a positional relationship between the wireless tag and the radio frequency reader based on the time variation information; and update a commodity registration list based on the determined time variation of the positional relationship.

Hereinafter, an article data processing device (may be referred to as a commodity registration device) and an article data processing method (may be referred to as a commodity registration method) according to example embodiments are described with reference to the accompanying drawings.

Figure 1:
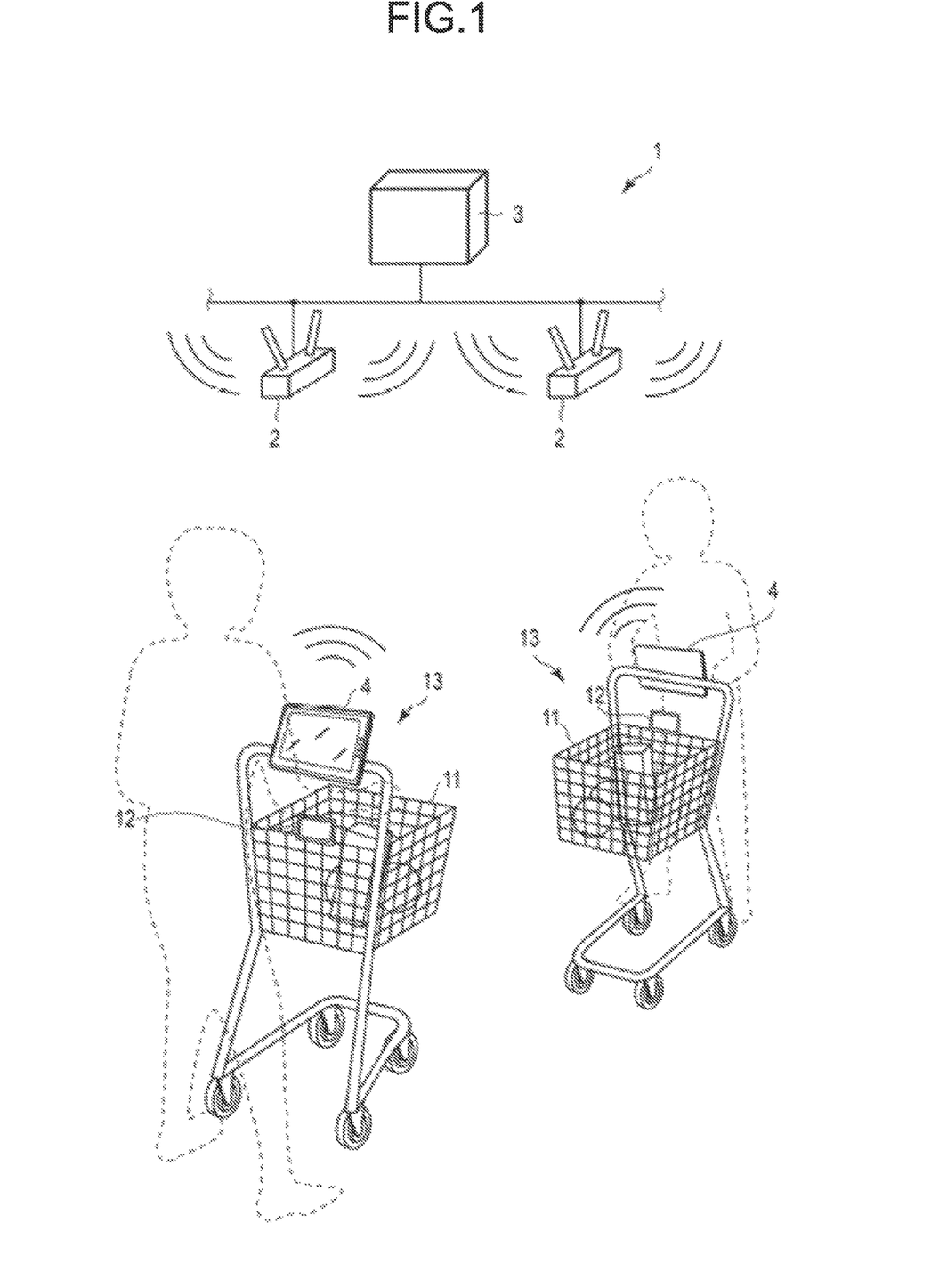
FIG. 1 is a schematic diagram illustrating a configuration of a commodity data processing system according to an embodiment.

FIG. 1 is a schematic diagram illustrating a configuration of an article data processing system according to the embodiment. The article data processing system generates a list of articles or items to which wireless tags such as RFID tags have been attached and stored in a container. In the present embodiment, the article data processing system is a commodity data processing system 1 installed in a retail store in which the commodities with the RFID tags are attached are being sold. The article data processing system is also applicable to a picking system that picks articles having wireless tags attached thereto, sorts the picked articles, and then places sorted articles into a cart or a container such as a pallet. In general, the article data processing system is applicable to any system for which a list of articles stored in some predetermined container or location is to be generated.

First, the RFID tag attached to the commodity is described. The RFID tag performs wireless communication through electromagnetic waves. For example, the RFID tag comprises an IC (Integrated Circuit) and an antenna. Information for identifying the RFID tag (tag information) is stored in advance in the IC of the RFID tag. The antenna of the RFID tag reflects a part of radio waves transmitted from a RFID reader. The RFID tag transmits then the tag information to the RFID reader through the radio waves reflected by the antenna. For example, the RFID tag is attached to a surface of the commodity or a packaging of the commodity. The RFID tag may also be built into the commodity. Furthermore, the RFID tag may be embedded in the commodity in some manner.

The tag information includes, for example, identification information for identifying the commodity and identification information unique to the RFID tag. The identification information for identifying the commodity is, for example, a commodity code composed of a character string unique to the commodity. The commodity code includes, for example, a corporation code indicating a company which manufactures the commodity and a commodity item code indicating the commodity. The identification information unique to the RFID tag is, for example, a unique identification code different from those of other RFID tags. In other words, the tag information includes the commodity code and the unique identification code. Specifically, the tag information is a combination of the commodity code and the unique identification code. When at least combined with the commodity code, the unique identification code may have any configuration as long as the tag information is different from that of other RFID tags.

Next, the commodity data processing system 1 is described.

The commodity data processing system 1 generates a commodity list indicating a list of commodities purchased by a customer in a store such as a retail store, and performs settlement based on the commodity list. The commodity data processing system 1 includes a wireless communication device 2, a store server (server device) 3, a commodity data processing device 4, and the like. The commodity data processing system 1 may further include a portable terminal held by a store clerk in the retail store.

The wireless communication device 2 relays communication between the store server 3 and the commodity data processing device 4. The wireless communication device 2 functions as, for example, an access point of a wireless LAN. The wireless communication device 2 is connected to the store server 3 to be capable of performing communication in a wired manner. The wireless communication device 2 is connected to the commodity data processing device 4 to be capable of performing communication in a wireless manner.

The store server 3 is provided in each retail store. The store server 3 includes a communication interface and a control section. The communication interface establishes communication with devices other than the store server. The communication interface includes a circuit for establishing communication with the commodity data processing device 4 via the wireless communication device 2. For example, the communication interface is connected to the wireless communication device 2 in a wired manner. The communication interface may establish wireless communication with the commodity data processing device 4 directly without intervention of the wireless communication device 2.

The control section performs various processing. The control section includes a processor and a memory. The processor is an arithmetic element that executes an arithmetic processing. The processor is, for example, a CPU (Central Processing Unit). The processor performs various processing by executing programs stored in the memory. The memory stores programs and data. The memory includes, for example, a ROM (Read-Only Memory), a RAM (Random Access Memory) that temporarily stores data and/or a storage that stores data.

The memory of the control section of the store server 3 includes a user database in which a user code and settlement information are stored in an associated manner. The user code is used for identifying a user. The settlement information is used in paying for the commodity in checkout processing. The settlement information includes one or more of value information, credit information, and account information. The value information indicates an amount (remaining amount) available for the settlement. The credit information relates to a credit card or the like that can be used for the settlement. The account information indicates a bank account that can be used for the settlement. The user database may further include notification destination information indicating a notification destination of a result of the checkout processing.

The memory of the control section of the store server 3 stores a commodity database in which a commodity code and commodity information are stored in an associated manner. As described above, the commodity code is identification information for identifying a commodity. The commodity information is information relating to the commodity. The commodity information indicates, for example, a commodity name, an amount of the commodity, and the like. The store server 3 acquires the commodity information from the commodity database based on the commodity code transmitted from the commodity data processing device 4, and transmits the commodity information to the commodity data processing device 4. The store server 3 may transmit the commodity database to the commodity data processing device 4 in advance.

The store server 3 acquires the commodity list including a list of commodities for checkout and the user code from the commodity data processing device 4. The store server 3 performs the checkout processing based on the commodity list acquired from the commodity data processing device 4 and the user database. Specifically, the store server 3 calculates a settlement amount based on the commodity list, acquires settlement information associated with the user code included in the commodity list from the user database, and performs settlement on the charge based on the settlement information and the settlement amount. The commodity data processing device 4 may calculate the settlement amount based on the commodity list. In this case, the commodity data processing device 4 adds the calculated settlement amount to the commodity list, and then transmits the commodity list to the store server 3.

Next, a configuration of the commodity data processing device 4 is described.

The commodity data processing device 4 (i.e., the article data processing device) generates the commodity list. The commodity data processing device 4 is mounted on a cart 13 provided with a basket (container) 11 having a container space for storing the commodity and a RFID reader 12. The part of the container having the container space may be referred to as a main body of the container. The commodity data processing device 4 is configured as a cart-type commodity data processing device by being mounted on the cart 13 provided with the basket 11 and the RFID reader 12.

Figure 2:
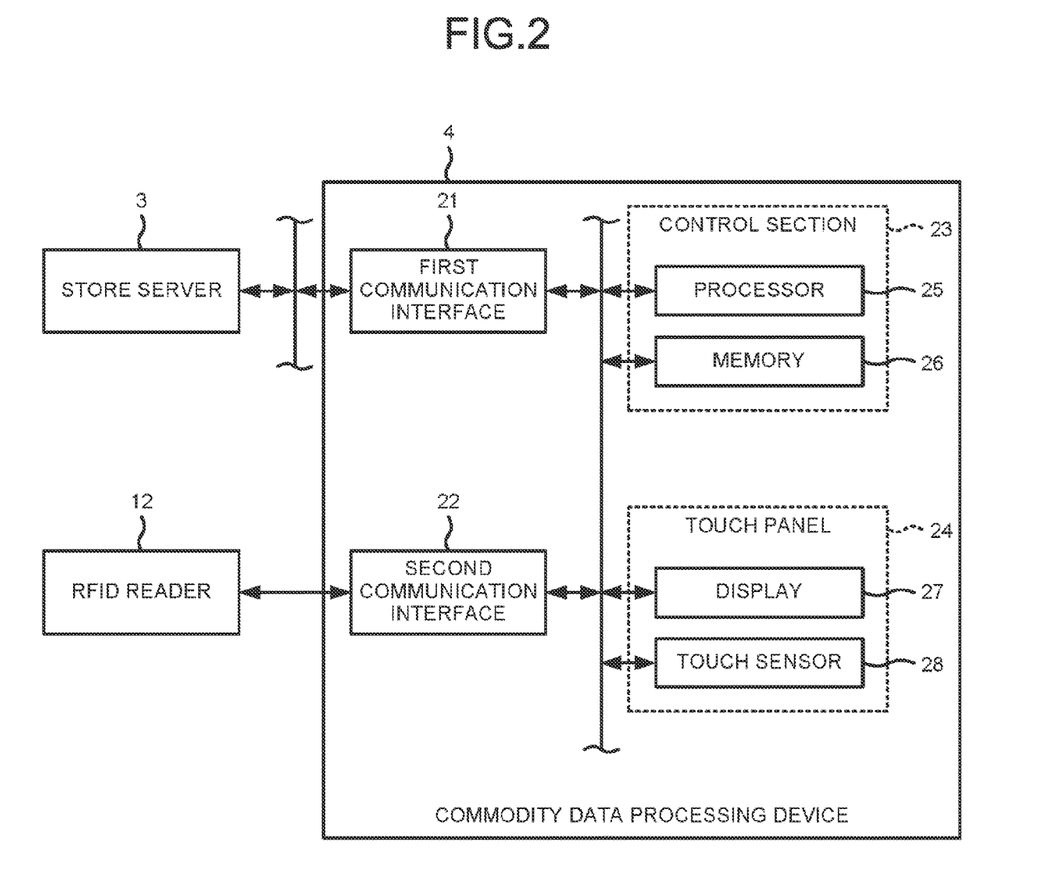
FIG. 2 is a block diagram illustrating a configuration of a commodity data processing device according to the embodiment.

FIG. 2 is a block diagram illustrating a configuration of the commodity data processing device 4. The commodity data processing device 4 includes a first communication interface 21, a second communication interface 22, a control section 23 and a touch panel 24.

The first communication interface 21 establishes communication with devices other than the commodity data processing device 4. The first communication interface 21 includes a circuit for communicating with the store server 3 via the wireless communication device 2 through wireless communication. The first communication interface 21 establishes communication with the store server 3 under the control of the control section 23.

The second communication interface 22 establishes communication with devices other than the commodity data processing device 4. The second communication interface 22 includes a circuit for communicating with the RFID reader 12. The second communication interface 22 establishes communication with the RFID reader 12 under the control of the control section 23.

The control section 23 performs various processing. The control section 23 includes a processor 25 and a memory 26.

The processor 25 is an arithmetic element that executes an arithmetic processing. The processor 25 is, for example, a CPU. The processor 25 performs various processing by executing the programs stored in the memory 26.

The memory 26 stores programs and data. The memory 26 is, for example, any one or more the ROM, the RAM, and a storage unit that stores data.

The touch panel 24 displays a screen and generates an operation signal based on a user operation. The touch panel 24 includes a display 27 and a touch sensor 28. The touch panel 24 may be an example of an operation element.

The display 27 displays a screen based on display data (screen data) transmitted from the control section 23 or a graphic controller.

The touch sensor 28 generates the operation signal indicating a position touched by the user who operates the commodity data processing device 4 on the screen displayed on the display 27.

The RFID reader 12 communicates with an RFID tag (wireless tag) attached to the commodity by outputting the radio waves. The RFID reader 12 includes an antenna and a signal processing circuit. The antenna of the RFID reader 12 transmits and receives the radio waves. The antenna is configured in such a manner that a resonant frequency thereof matches a frequency (e.g., a UHF (Ultrahigh Frequency) band) corresponding to the RFID tag attached to the commodity. The signal processing circuit processes a signal discharged to the antenna. A range in which the RFID reader 12 can communicate with the RFID tag is referred to as a communication range.

Figure 3:
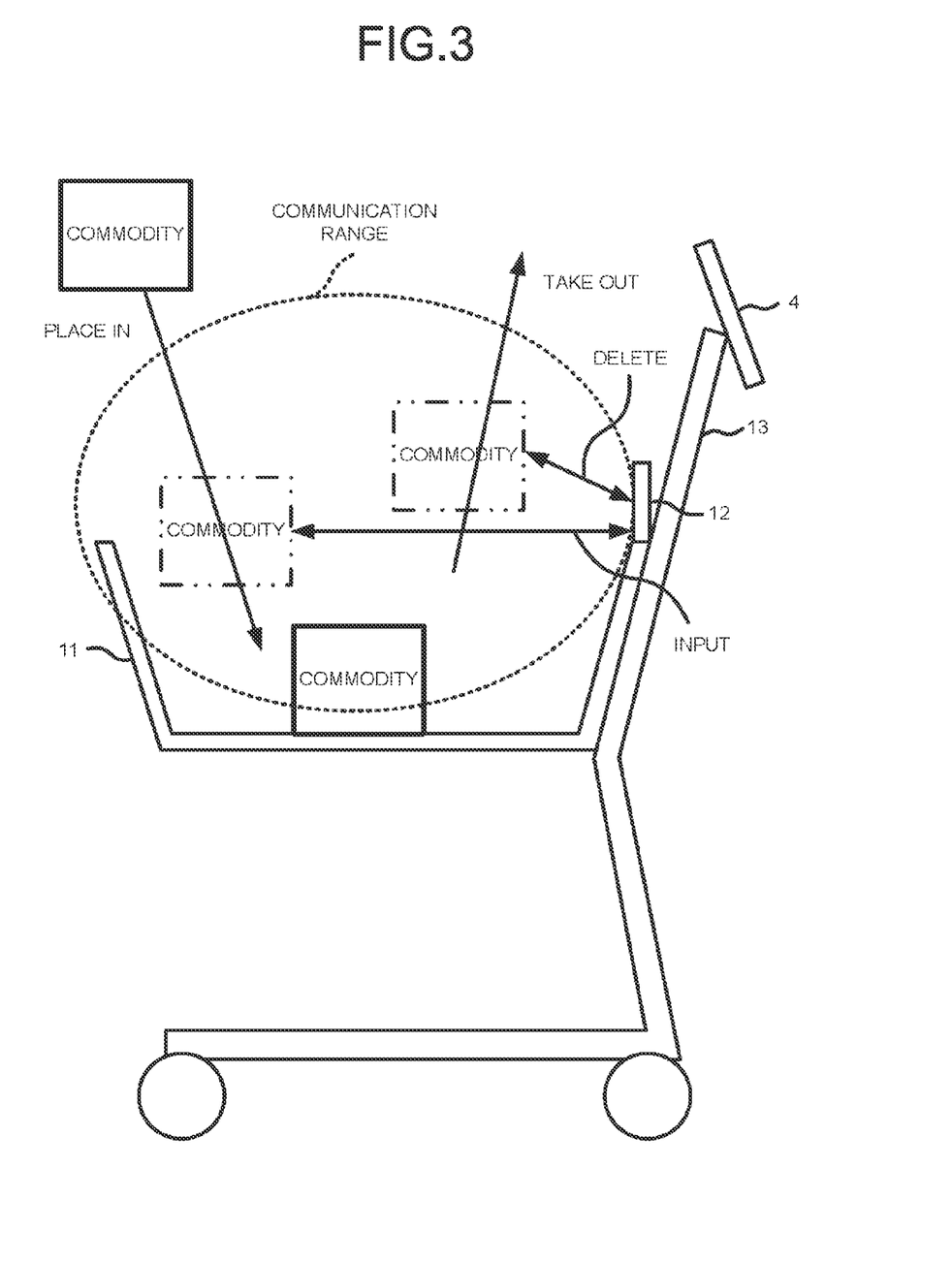
FIG. 3 is a schematic diagram illustrating the commodity data processing device and a RFID reader according to the embodiment.

FIG. 3 is a schematic diagram illustrating the communication range of the RFID reader 12.

As shown in FIG. 3, the communication range of the RFID reader 12 covers an opening of the basket 11. According to such a configuration, the RFID reader 12 can acquire the tag information from the RFID tag attached to a commodity placed in the basket 11 or a commodity taken out of the basket 11. The RFID reader 12 can constantly communicate with the RFID tag attached to the commodity that is already placed in the basket 11 and is present within the communication range.

The radio waves detected by the RFID reader 12 change in accordance with the change in a positional relationship (e.g., a distance) between the RFID tag and the RFID reader 12. The RFID reader 12 generates radio wave change information (may be referred to as time variation information) based on a detection result of the radio waves. The radio wave change information indicates the detection result of the radio waves from the RFID tag in the RFID reader 12 in time series. For example, the RFID reader 12 detects a phase and intensity of the radio waves from the RFID tag, and generates the radio wave change information indicating the detection results relating to the phase and intensity of the radio waves from the RFID tag in time series. The RFID reader 12 may generate the radio wave change information indicating the detection results relating to either the phase or the intensity of the radio waves from the RFID tag in time series.

The RFID reader 12 includes a communication interface for establishing wired or wireless communication with the commodity data processing device 4. The RFID reader 12 transmits the tag information acquired from the RFID tag and the generated radio wave change information to the commodity data processing device 4 via the communication interface.

First Embodiment

Next, the operation performed by the commodity data processing device 4 according to the first embodiment is described.

Figure 4:
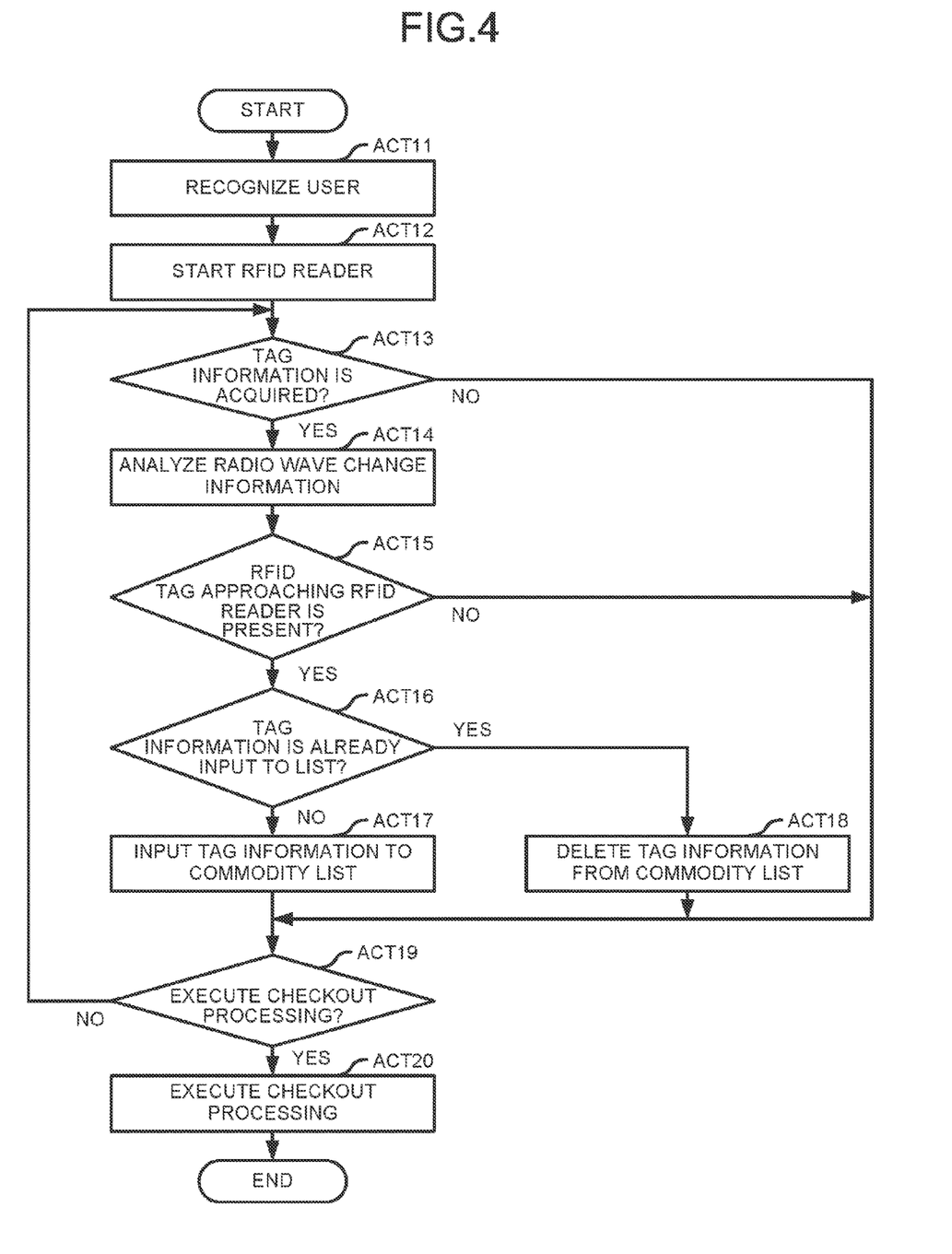
FIG. 4 is a flowchart depicting an example of processing performed by the commodity data processing device according to the embodiment.

FIG. 4 is a flowchart depicting an example of processing of generating the commodity list and the checkout processing performed by the commodity data processing device 4.

The processor 25 of the control section 23 of the commodity data processing device 4 executes the program stored in the memory 26 to execute processing of generating the commodity list.

First, the processor 25 recognizes the user of the commodity data processing device 4 (ACT 11). For example, the processor 25 acquires the user code from the user and transmits the user code to the store server 3. The store server 3 refers to the user database, searches for a user identified by the received user code, and transmits the search result to the commodity data processing device 4. In this way, the processor 25 of the commodity data processing device 4 specifies the user who operates the commodity data processing device 4. The processor 25 acquires the user code based on an input by the user from the touch panel 24, for example. The commodity data processing device 4 may include a camera or a scanner to read the user code. The commodity data processing device 4 may include a camera for acquiring a facial image of the user, and use the acquired facial image instead of the user code.

Furthermore, the processor 25 of the commodity data processing device 4 generates the commodity list including (or in association with) the user code, and stores the generated commodity list in the memory 26. At this point of time, the commodity list is blank. The tag information acquired from the RFID tag attached to the commodity can be input to the commodity list. The processor 25 may control a display to display a list of commodities based on the tag information input to the commodity list. For example, the processor 25 may control the display to display a list including a commodity name and a price based on the tag information and the commodity database in the store server 3 or the commodity database acquired in advance from the store server 3.

The processor 25 starts the RFID reader 12 connected to the second communication interface 22 (ACT 12). Thereby, the RFID reader 12 enters a state of outputting the radio waves to the communication range. When the RFID tag enters the communication range, the RFID reader 12 acquires the tag information from the RFID tag and transmits the acquired tag information to the commodity data processing device 4. The RFID reader 12 generates the radio wave change information based on the radio waves from the RFID tag, and transmits the generated radio wave change information to the commodity data processing device 4. The RFID reader 12 transmits the tag information of the RFID tag and the radio wave change information to the commodity data processing device 4 in an associated manner.

The processor 25 of the commodity data processing device 4 determines whether or not the tag information is transmitted from the RFID reader 12 (ACT 13). If it is determined that the tag information is not transmitted from the RFID reader 12 (No in ACT 13), the process proceeds to ACT 19 described below.

If it is determined that the tag information is transmitted from the RFID reader 12 (Yes in ACT 13), the processor 25 analyzes the radio wave change information (ACT 14). The processor 25 determines the change in the positional relationship between the RFID reader 12 and the RFID tag attached to the commodity by analyzing the radio wave change information. As described above, the radio waves received by the RFID reader 12 from the RFID tag change in accordance with the change in the positional relationship (e.g., the distance) between the RFID tag and the RFID reader 12. Therefore, the processor 25 can determine the change in the positional relationship between the RFID tag and the RFID reader 12 with time based on the radio wave change information.

The intensity of the radio waves received by the RFID reader 12 from the RFID tag changes according to the distance between the RFID reader 12 and the RFID tag. For example, the processor 25 determines the change in the distance between the RFID reader 12 and the RFID tag based on the change in the intensity of the radio waves received by the RFID reader 12 from the RFID tag with time.

For example, the phase of the radio waves received by the RFID reader 12 from the RFID tag changes in accordance with the change in the distance between the RFID reader 12 and the RFID tag. The processor 25 may determine the change in the distance between the RFID reader 12 and the RFID tag based on the change in the phase of the radio waves received by the RFID reader 12 from the RFID tag with time.

The processor 25 may determine the change in the distance between the RFID reader 12 and the RFID tag based on both the change in the intensity of the radio waves received by the RFID reader 12 from the RFID tag and the change in the phase of the radio waves received by the RFID reader 12 from the RFID tag, for example.

The RFID reader 12 may not generate the radio wave change information, but sequentially transmit the intensity and phase of the radio waves received by the RFID reader 12 from the RFID tag to the commodity data processing device 4, and the processor 25 of the commodity data processing device 4 may generate the radio wave change information based on the information from the RFID reader 12.

The processor 25 determines whether or not the RFID tag approaching the RFID reader 12 is present based on the determination result of the change in the positional relationship between the RFID reader 12 and the RFID tag attached to the commodity (ACT 15). If it is determined that the RFID tag approaching the RFID reader 12 is not present (No in ACT 15), the process proceeds to ACT 19 described below.

If it is determined that the RFID tag approaching the RFID reader 12 is present (Yes in ACT 15), the processor 25 determines whether or not the tag information of the RFID tag approaching the RFID reader 12 is already input to the commodity list (ACT 16). The process in ACT 16 may be referred to as an overlap check. In Act 16, the processor 25 determines whether or not the same tag information is already included in the commodity list by comparing the tag information registered in the commodity list with the tag information of the RFID tag approaching the RFID reader 12.

If it is determined that the tag information of the RFID tag approaching the RFID reader 12 is not input to the commodity list yet (No in ACT 16), the processor 25 inputs the tag information of the RFID tag approaching the RFID reader 12 to the commodity list (ACT 17), and then the process proceeds to ACT 19. If the tag information of the RFID tag approaching the RFID reader 12 is not input to the commodity list, the processor 25 determines that the RFID tag attached to the commodity approaches the RFID reader 12 because the commodity is placed in the basket 11. Therefore, the processor 25 newly inputs the tag information to the commodity list.

If it is determined that the tag information of the RFID tag approaching the RFID reader 12 is already input to the commodity list (Yes in ACT 16), the processor 25 deletes the tag information of the RFID tag approaching the RFID reader 12 from the commodity list (ACT 18), and then the process proceeds to ACT 19. If the tag information of the RFID tag approaching the RFID reader 12 is already input to the commodity list, the processor 25 determines that the RFID tag attached to the commodity approaches the RFID reader 12 because the commodity is taken out of the basket 11. Therefore, the processor 25 deletes the tag information from the commodity list.

The processor 25 determines whether to execute the checkout processing (ACT 19). For example, the processor 25 determines whether to execute the checkout processing based on an operation performed by the user on the touch panel 24. The processor 25 may determine whether to execute the checkout processing based on a signal received via the first communication interface 21, for example. If the processor 25 determines not to execute the checkout processing (No in ACT 19), the process returns to ACT 13. Thus, the processing in ACT 13 to ACT 19 is repeated until the processor 25 determines to execute the checkout processing.

If the processor 25 determines to execute the checkout processing (Yes in ACT 19), the processor 25 executes the checkout processing (ACT 20), and then terminates the processing. For example, the processor 25 transmits the commodity list including the user code to the store server 3. If the commodity list is received from the commodity data processing device 4, the store server 3 refers to the user database to acquire the settlement information based on the user code included in the commodity list. The store server 3 calculates the settlement amount based on the commodity list. The store server 3 performs settlement on the charge based on the settlement information and the settlement amount. The processor 25 may calculate the settlement amount and add the settlement amount to the commodity list each time the commodity list is updated in ACT 17 or ACT 18.

As described above, the commodity data processing device 4 generates the commodity list which is a list of commodities to which wireless tags are attached and being stored in a predetermined container such as the basket 11. First, the RFID reader 12 serving as a wireless tag reader for reading the wireless tag acquires the tag information including the identification code for identifying the wireless tag from the wireless tag by communicating with the wireless tag present in the vicinity of the container. The wireless tag reader generates the radio wave change information indicating the change in the radio waves from the wireless tag with time. The commodity data processing device 4 includes the communication interface, the processor 25 and the memory 26. The communication interface of the commodity data processing device 4 acquires, from the wireless tag reader, the tag information including the identification code for identifying the wireless tag attached to the commodity and the radio wave change information indicating the change in radio waves from the wireless tag with time. The processor 25 of the commodity data processing device 4 determines the change in the positional relationship between the wireless tag and the wireless tag reader based on the radio wave change information. The processor 25 determines whether to input the tag information acquired from the wireless tag to the commodity list based on the determination result of the change in the positional relationship between the wireless tag and the wireless tag reader. For example, if the processor 25 determines that the wireless tag approaches the wireless tag reader, the processor 25 updates the commodity list with the tag information acquired from the wireless tag.

According to such a configuration, the commodity list is not updated when only the tag information from the wireless tag is acquired by the RFID reader 12. Thereby, the commodity data processing device 4 can prevent the tag information relating to the commodity from being erroneously input to the commodity list.

If it is determined that the wireless tag approaches the wireless tag reader, the processor 25 of the commodity data processing device 4 determines whether or not the tag information acquired from the wireless tag is already input to the commodity list. If the tag information acquired from the wireless tag is not input to the commodity list yet, the processor 25 inputs the tag information to the commodity list. If the tag information acquired from the wireless tag is already input to the commodity list, the processor 25 deletes the tag information from the commodity list. It is difficult for the processor 25 to determine whether the user intends to take the commodity out of the basket 11 or intends to place the commodity in the basket 11 in the determination about whether the wireless tag approaches the wireless tag reader. However, whether the user intends to take the commodity out of the basket 11 or intends to place the commodity in the basket 11 can be determined by the processor depending on whether the tag information is already input to the commodity list. As a result, the tag information relating to the commodity can be prevented from being erroneously input to the commodity list.

Second Embodiment

Next, the operation performed by the commodity data processing device 4 according to the second embodiment is described. Since the configuration of the commodity data processing device 4 is the same as that of the commodity data processing device 4 according to the first embodiment, the description thereof is omitted.

Figure 5:
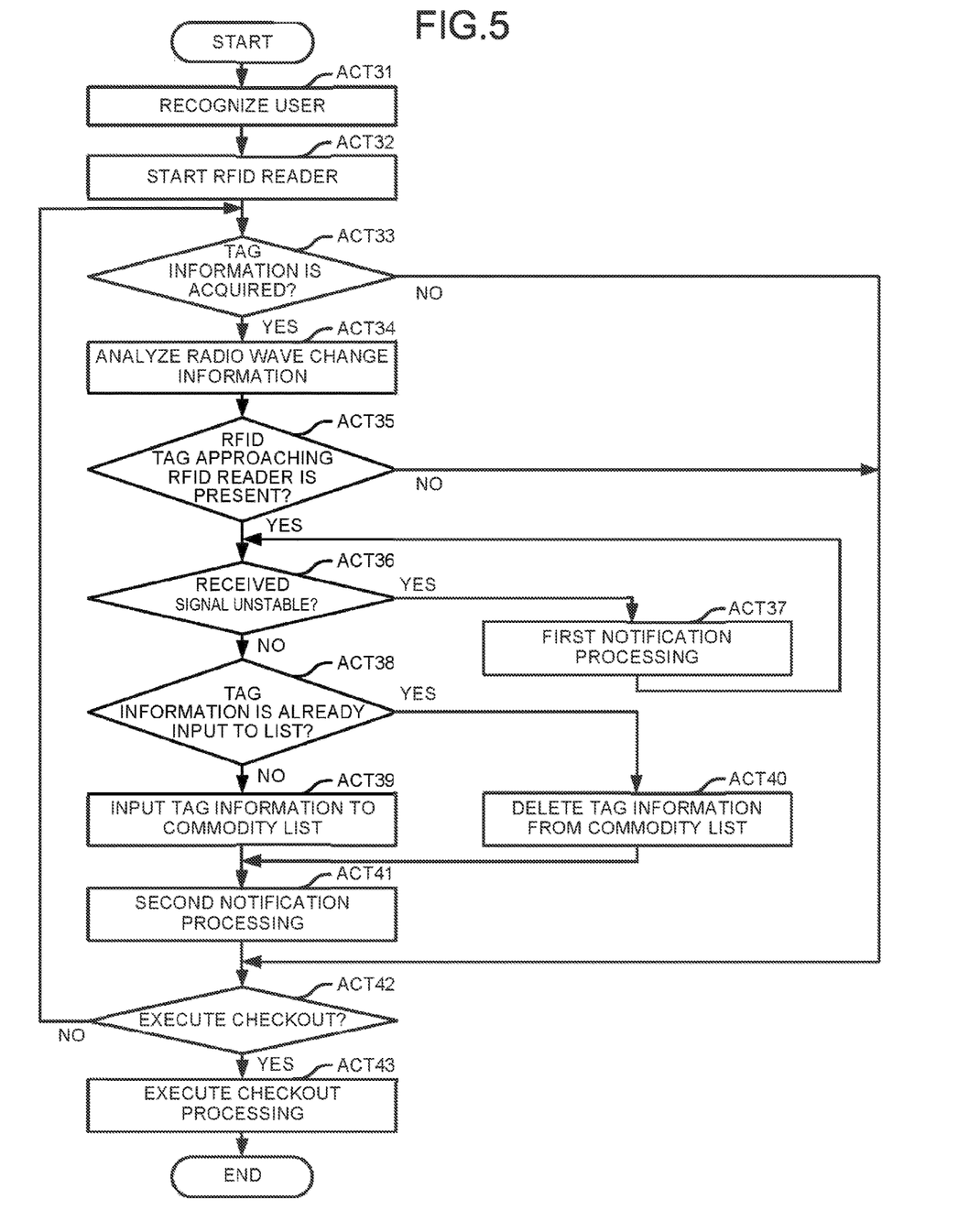
FIG. 5 is a flowchart depicting another example of processing performed by the commodity data processing device according to the embodiment.

FIG. 5 is a flowchart depicting another example of the processing of generating the commodity list and the checkout processing performed by the commodity data processing device 4. The processor 25 of the control section 23 of the commodity data processing device 4 executes the program stored in the memory 26 to execute processing of generating the commodity list.

The processor 25 recognizes the user of the commodity data processing device (ACT 31).

The processor 25 starts the RFID reader 12 connected to the second communication interface 22 (ACT 32). Thereby, the RFID reader 12 enters a state of outputting the radio waves to the communication range. If the RFID tag enters the communication range, the RFID reader 12 acquires the tag information from the RFID tag and transmits the acquired tag information to the commodity data processing device 4. The RFID reader 12 generates the radio wave change information based on the radio waves from the RFID tag, and transmits the generated radio wave change information to the commodity data processing device 4. The RFID reader 12 transmits the tag information of the RFID tag and the radio wave change information to the commodity data processing device 4 in an associated manner.

The processor 25 of the commodity data processing device 4 determines whether or not the tag information is transmitted from the RFID reader 12 (ACT 33). If it is determined that the tag information is not transmitted from the RFID reader 12 (No in ACT 33), the process proceeds to ACT 42 described below.

If it is determined that the tag information is transmitted from the RFID reader 12 (Yes in ACT 33), the processor 25 analyzes the radio wave change information (ACT 34). The processor 25 determines a change in the positional relationship between the RFID reader 12 and the RFID tag attached to the commodity by analyzing the radio wave change information. The processor 25 determines whether or not the RFID tag approaching the RFID reader 12 is present based on the determination result of the change in the positional relationship between the RFID reader 12 and the RFID tag attached to the commodity (ACT 35). If it is determined that the RFID tag approaching the RFID reader 12 is not present (No in ACT 35), the process proceeds to ACT 42 described below.

If it is determined that the RFID tag approaching the RFID reader 12 is present (Yes in ACT 35), the processor 25 determines whether or not a received signal is stable based on the radio wave change information (ACT 36). Specifically, the processor 25 determines whether or not the radio waves received by the RFID reader 12 from the RFID tag is still changing with time. In this way, the processor 25 determines whether or not the commodity is present within the communication range of the RFID reader 12 and the user still holds the commodity. The processor 25 determines that the commodity is present within the communication range of the RFID reader 12 and the user still holds the commodity if the received signal is unstable.

If it is determined that the received signal is unstable (Yes in ACT 36), the processor 25 performs a first notification processing (ACT 37), and then the process returns to ACT 36. In other words, the processor 25 repeats the first notification processing until the received signal becomes stable.

The first notification processing is processing in which the processor 25 provides information to the user of the commodity data processing device 4. Specifically, in the first notification processing, the processor 25 outputs information for notifying the user that the commodity is present within the communication range of the RFID reader 12 via the touch panel 24, a speaker (not shown), the first communication interface 21 or the second communication interface 22. Furthermore, the processor 25 may control the display 27 of the touch panel 24 to display the commodity information of the commodity of which the corresponding received signal changes.

If it is determined that the received signal is stable (No in ACT 36), the processor 25 determines whether or not the tag information of the RFID tag approaching the RFID reader 12 is already input to the commodity list (ACT 38). The process in ACT 38 may be referred to as an overlap check. In Act 38, the processor 25 determines whether or not the same tag information is already included in the commodity list by comparing the tag information registered in the commodity list with the tag information of the RFID tag approaching the RFID reader 12.

If it is determined that the tag information of the RFID tag approaching the RFID reader 12 is not input to the commodity list yet (No in ACT 38), the processor 25 inputs the tag information of the RFID tag approaching the RFID reader 12 to the commodity list (ACT 39), and then the process proceeds to ACT 41.

If it is determined that the tag information of the RFID tag approaching the RFID reader 12 is already input to the commodity list (Yes in ACT 38), the processor 25 deletes the tag information of the RFID tag approaching the RFID reader 12 from the commodity list (ACT 40), and then the process proceeds to ACT 41.

If the commodity list is updated in ACT 39 or ACT 40, the processor 25 performs a second notification processing (ACT 41).

The second notification processing is processing in which the processor 25 provides the information to the user of the commodity data processing device 4. Specifically, in the second notification processing, the processor 25 outputs information for notifying the user that the commodity is updated via the touch panel 24, the speaker (not shown), the first communication interface 21 or the second communication interface 22. For example, the processor 25 may control the display 27 of the touch panel 24 to display an update result of the commodity list. The processor 25 may control the display 27 of the touch panel 24 to display the commodity information corresponding to the input tag information if the tag information is already input to the commodity list in ACT 39. The processor 25 may control the display 27 of the touch panel 24 to display the commodity information corresponding to the deleted tag information if the tag information is deleted from the commodity list in ACT 40.

The processor 25 determines whether to execute the checkout processing (ACT 42). For example, the processor 25 determines whether to execute the checkout processing based on the operation performed by the user on the touch panel 24. The processor 25 may determine whether to execute the checkout processing based on a signal received via the first communication interface 21, for example. If the processor 25 determines not to execute the checkout processing (No in ACT 42), the process returns to ACT 33. Thus, the processing in ACT 33 to ACT 42 is repeated until the processor 25 determines to execute the checkout processing.

If the processor 25 determines to execute the checkout processing (Yes in ACT 42), the processor 25 executes the checkout processing (ACT 43) and then terminates the processing. For example, the processor 25 transmits the commodity list including the user code to the store server 3. After the store server 3 receives the commodity list from the commodity data processing device 4, the store server 3 refers to the user database to acquire the settlement information based on the user code of the commodity list. The store server 3 calculates the settlement amount based on the commodity list. The store server 3 performs settlement on the charge based on the settlement information and the settlement amount. The processor 25 may calculate the settlement amount and add the settlement amount to the commodity list each time the commodity list is updated in ACT 39 or ACT 40.

As described above, the processor 25 of the commodity data processing device 4 determines whether or not the radio waves (received signal) received by the RFID reader 12 from the RFID tag change based on the radio wave change information. The processor 25 determines that the commodity is present within the communication range of the RFID reader 12 and the user still holds the commodity if the received signal changes. On the other hand, the processor 25 determines that the user has placed the commodity in the basket 11 or the user has taken the commodity out of the basket 11 if the received signal does not change. The processor 25 updates the commodity list with (e.g., by inputting or deleting) the tag information acquired from the RFID tag attached to the commodity if the received signal does not change.

According to such a configuration, the commodity list is not updated when only the tag information is acquired by the RFID reader 12 from the wireless tag. Thereby, the commodity data processing device 4 can prevent the tag information relating to the commodity from being erroneously input to the commodity list.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity container, comprising:
a main body including a container space;
a radio frequency reader with a communication range that covers at least part of an opening of the container space, the radio frequency reader being configured to output tag information based on a radio frequency signal received from a wireless tag attached to a commodity and output time variation information indicating a time variation of the radio frequency signal; and
a registration device attached to the main body and comprising:
a communication interface configured to receive the tag information and the time variation information from the radio frequency reader; and
a processor configured to:
determine a time variation of a positional relationship between the wireless tag and the radio frequency reader based on the time variation information;
carry out a stability check to determine whether the positional relationship is stable based on the time variation information; and
after the stability check, update a commodity registration list based on the determined time variation of the positional relationship.

2. The commodity container according to claim 1, wherein the processor is further configured to carry out a first notification operation to indicate information about the commodity upon determining that the positional relationship is not stable.

3. The commodity container according to claim 2, wherein
the registration device further comprises a display, and
during the first notification operation, the processor controls the display to display a screen including the information about the commodity.

4. The commodity container according to claim 2, wherein the processor is further configured to carry out a second notification operation to indicate an update of the commodity registration list upon the commodity registration list being updated.

5. The commodity container according to claim 4, wherein
during the first notification operation, the processor controls a display to display a first screen including information about the commodity, and during the second notification operation, the processor controls the display to display a second screen including information about the update of the commodity registration list.

6. The commodity container according to claim 1, wherein
the processor is further configured to determine whether the wireless tag is approaching the radio frequency reader based on the determined time variation, and
the processor carries out the stability check when the wireless tag is approaching radio frequency reader.

7. The commodity container according to claim 6, wherein
the tag information includes a tag identifier of the wireless tag and a commodity identifier of the commodity, and
the processor is further configured to:
carry out an overlap check to determine whether the tag identifier is already included in the commodity registration list; and
update the commodity registration list by adding the tag identifier and the commodity identifier to the commodity registration list when determining that the commodity registration list does not include the tag identifier.

8. The commodity container according to claim 7, wherein the processor is further configured to carry out the overlap check upon determining that the positional relationship is stable.

9. The commodity container according to claim 1, wherein
the registration device further comprises an operation element and a wireless communication interface, and
the processor is further configured to control the wireless communication interface to transmit the commodity registration list in response to a user operation of the operation element.

10. The commodity container according to claim 1, wherein the commodity container is a shopping cart.

11. A portable registration device attachable to a commodity container, the device comprising:
a communication interface configured to receive tag information and time variation information from a radio frequency reader coupled to the commodity container, the tag information being output by the radio frequency reader based on a radio frequency signal from a wireless tag attached to a commodity within a communication range that covers at least part of an opening of the commodity container, and the time variation information indicating time variation of the radio frequency signal; and
a processor configured to:
determine a time variation of a positional relationship between the wireless tag and the radio frequency reader based on the time variation information;
carry out a stability check to determine whether the positional relationship is stable based on the time variation information; and
after the stability check, update a commodity registration list based on the determined time variation of the positional relationship.

12. The portable registration device according to claim 11, wherein the processor is further configured to carry out a first notification operation to indicate information about the commodity upon determining that the positional relationship is not stable, and a second notification operation to indicate an update of the commodity registration list upon the commodity registration list being updated.

13. The portable registration device according to claim 11, wherein
the processor is further configured to determine whether the wireless tag is approaching the radio frequency reader based on the determined time variation, and
the processor updates the commodity registration list when the wireless tag is approaching radio frequency reader.

14. The portable registration device according to claim 13, wherein
the tag information includes a tag identifier of the wireless tag and a commodity identifier of the commodity, and
the processor is further configured to:
carry out an overlap check to determine whether the tag identifier is already included in the commodity registration list; and
update the commodity registration list by adding the tag identifier and the commodity identifier to the commodity registration list when determining that the commodity registration list does not include the tag identifier.

15. The portable registration device according to claim 13, wherein the processor is further configured to carry out the overlap check upon determining that the positional relationship is stable.

16. A commodity registration method comprising:
receiving, with a tag reader, a radio frequency signal from a wireless tag attached to a commodity that is within a communication range of the tag reader, tag reader being positioned such that the communication range covers at least part of an opening of a commodity container;
outputting tag information that was stored in the wireless tag and time variation information indicating a time variation of the radio frequency signal from the wireless tag;
determining a time variation of a positional relationship between the wireless tag and the tag reader based on the time variation information;
carrying out a stability check to determine whether the positional relationship is stable based on the time variation information; and
after the stability check, updating a commodity registration list based on the determined time variation of the positional relationship.

17. The commodity registration method according to claim 16, further comprising:
carrying out a first notification operation to indicate information about the commodity upon determining that the positional relationship is not stable; and
carrying out a second notification operation to indicate an update of the commodity registration list upon the commodity registration list being updated.

18. The commodity registration method according to claim 16, further comprising:
determining whether the wireless tag is approaching the tag reader based on the determined time variation, wherein
the commodity registration list is updated when the wireless tag is approaching tag reader.

19. The commodity registration method according to claim 18, wherein the tag information includes a tag identifier of the wireless tag and a commodity identifier of the commodity, and
the method further comprises:
carrying out an overlap check to determine whether the tag identifier is already included in the commodity registration list.

20. The commodity registration method according to claim 19, wherein the overlap check is carried out upon determining that the positional relationship is stable.

\* \* \* \* \*

UNITED STATES PATENT AND TRADEMARK OFFICE
CERTIFICATE OF CORRECTION

PATENT NO. : 11,669,702 B2
APPLICATION NO. : 17/410389
DATED : June 6, 2023
INVENTOR(S) : Sunao Tsuchida et al.

It is certified that error appears in the above-identified patent and that said Letters Patent is hereby corrected as shown below:

In the Claims

Column 13, Line 11, insert --the-- before "radio".

Column 14, Line 59, insert --the-- before "tag" (second occurrence).

Signed and Sealed this
Second Day of January, 2024

Katherine Kelly Vidal
Director of the United States Patent and Trademark Office